United States Patent
Sogabe et al.

(10) Patent No.: US 6,934,744 B2
(45) Date of Patent: Aug. 23, 2005

(54) SERVICE SYSTEM

(75) Inventors: Hideki Sogabe, Tokyo (JP); Hiroshi Uchikoga, Tokyo (JP)

(73) Assignee: Visionare Corporation, Tokyo (JP)

( * ) Notice: Subject to any disclaimer, the term of this patent is extended or adjusted under 35 U.S.C. 154(b) by 675 days.

(21) Appl. No.: 09/816,873

(22) Filed: Mar. 22, 2001

(65) Prior Publication Data

US 2001/0036360 A1 Nov. 1, 2001

(30) Foreign Application Priority Data

Mar. 22, 2000 (JP) .................................... 2000/079647

(51) Int. Cl.⁷ ............................................ G06F 15/16
(52) U.S. Cl. ...................... 709/219; 709/218; 709/229
(58) Field of Search ................................ 709/225, 229, 709/217, 218, 219; 713/201; 715/200.1

(56) References Cited

U.S. PATENT DOCUMENTS

| | | | | |
|---|---|---|---|---|
| 5,909,589 A | * | 6/1999 | Parker et al. ............... | 713/201 |
| 6,035,329 A | * | 3/2000 | Mages et al. ............... | 709/217 |
| 6,408,315 B1 | * | 6/2002 | McManus et al. ....... | 715/500.1 |
| 6,463,467 B1 | * | 10/2002 | Mages et al. ............... | 709/218 |

FOREIGN PATENT DOCUMENTS

JP 11-162089 6/1999

* cited by examiner

*Primary Examiner*—Patrice Winder
(74) *Attorney, Agent, or Firm*—Meyertons, Hood, Kivlin, Kowert & Goetzel, P.C.; Eric B. Meyertons

(57) ABSTRACT

A multimedia information playback apparatus includes a first input unit, second input unit, and playback unit. The first input unit receives multimedia information including video data and audio data distributed from a first distribution source. The second input unit receives control information distributed from a second distribution source. The playback unit plays back the multimedia information received by the first input unit on the basis of the control information received by the second input unit. A multimedia information playback method is also disclosed.

31 Claims, 8 Drawing Sheets

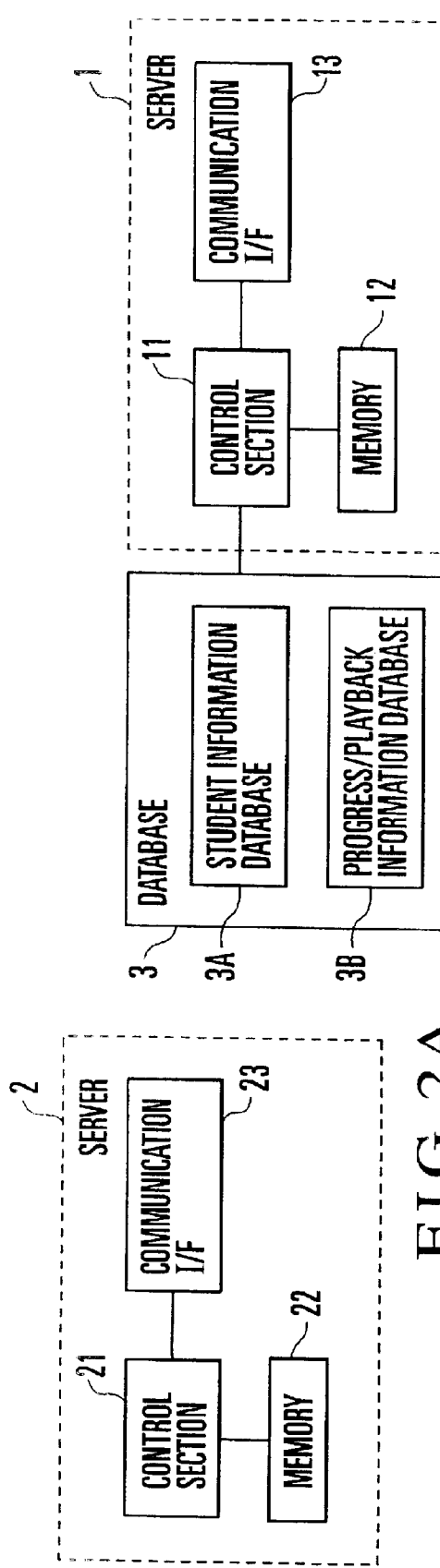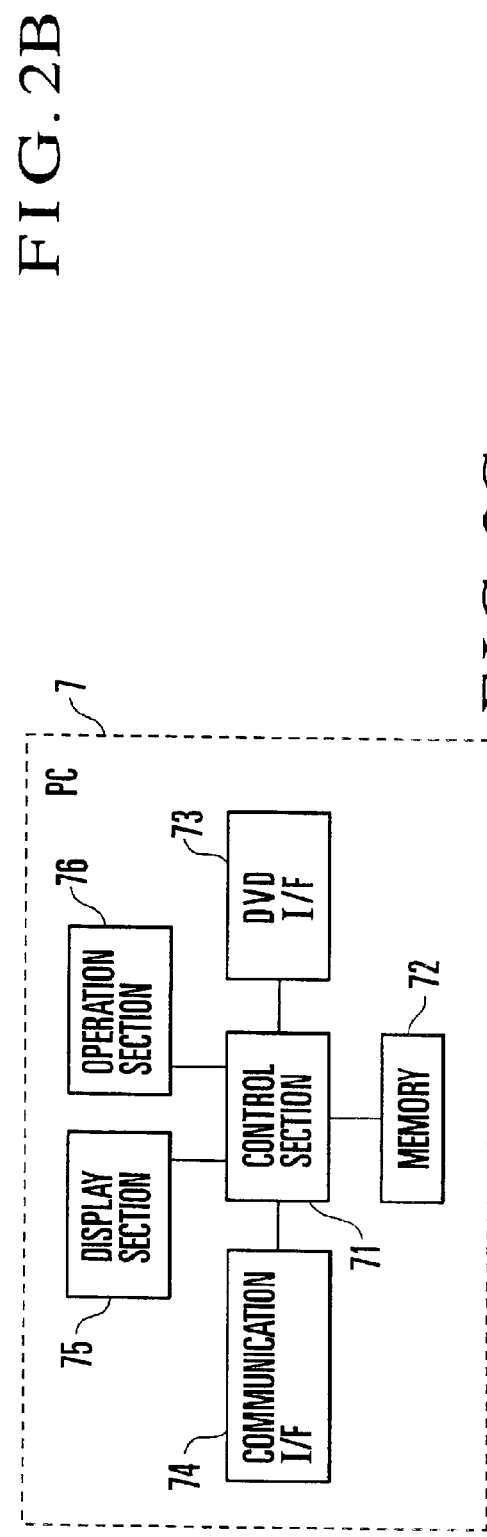
FIG. 2A
FIG. 2B
FIG. 2C

SOFTWARE OF PC 7

PLAYBACK ASSISTANT SOFTWARE — 7A
FUNCTION OF REPAIRING IFO FILE OR VOB FILE OF DVD

PLAYBACK OBJECT — 7B
FUNCTION OF TRANSFERRING DATA TO PLAYBACK ASSISTANT SOFTWARE AND INSTRUCTING IT TO REPAIR FILE OF DVD ON THE BASIS OF EXECUTION OF SOFTWARE (INTERNET BROWSER) FOR BROWSING HOMEPAGE OF INTERNET IN ACCORDANCE WITH INSTRUCTION FROM SERVER SIDE AND FUNCTION OF DISPLAYING PLAYBACK WINDOW OF DVD

DVD PLAYER — 7C
FUNCTION OF PLAYING BACK INFORMATION FROM DVD IN ACCORDANCE WITH INSTRUCTION FROM PLAYBACK OBJECT

FIG. 3A

SOFTWARE AND DATA OF SERVER 1

| SOFTWARE | DATA |
|---|---|
| SECURITY GATE — 1A<br>FUNCTION OF INHIBITING USER FROM BROWSING IMPERMISSIBLE PAGE AND FUNCTION OF SENDING APPROPRIATE WEB PAGE TO PC 7 (SOFTWARE THAT RUNS ON SERVER SIDE) | WEB PAGE — 1B<br>TEXTBOOK PREPARED BY TEACHER (LOADED IN PC AND DISPLAYED WHEN INTERNET BROWSER OF PC 7 IS EXECUTED)<br>STUDENT INFORMATION DATABASE — 3A<br>CORRESPONDENCE TABLE BETWEEN STUDENT AND PROGRESS OF EACH SUBJECT<br>PROGRESS/PLAYBACK INFORMATION DATABASE — 3B<br>• CORRESPONDENCE TABLE BETWEEN PROGRESS (PAGE) OF EACH ITEM AND PLAYBACK CLIP NAME<br>• CORRESPONDENCE TABLE BETWEEN WEB PAGE AND DVD PLAYBACK POSITION |

FIG. 3B

SOFTWARE AND DATA OF SERVER 2

| SOFTWARE | DATA |
|---|---|
| SERVER-SIDE PLAYBACK CONTROL OBJECT — 2A<br>FUNCTION OF TRANSFERRING DVD REPAIR INFORMATION TO CLIENT-SIDE PLAYBACK CONTROL OBJECT AND FUNCTION OF TRANSFERRING PLAYBACK CONTROL INFORMATION TO CLIENT-SIDE PLAYBACK CONTROL OBJECT (SOFTWARE THAT RUNS ON SERVER SIDE)<br>CLIENT-SIDE PLAYBACK CONTROL OBJECT — 2B<br>SOFTWARE THAT RUNS WHEN LOADED IN THE PC IN ACCORDANCE WITH INSTRUCTION OF WEB PAGE BY EXECUTING INTERNET BROWSER OF PC 7. THIS SOFTWARE TRANSMITS REPAIR INFORMATION FOR DVD PLAYBACK FROM SERVER-SIDE PLAYBACK CONTROL OBJECT TO PLAYBACK OBJECT OF PC 7 IN ACCORDANCE WITH INSTRUCTION OF WEB PAGE. | DVD REPAIR INFORMATION — 2C<br>REPAIR IFO, REPAIR VOB<br>DATABASE — 2D<br>CORRESPONDENCE TABLE BETWEEN PLAYBACK CLIP NAME, REPAIR INFORMATION, AND DVD PLAYBACK POSITION |

FIG. 3C

SERVICE SYSTEM

BACKGROUND OF THE INVENTION

The present invention relates to a service system using a DVD (Digital Versatile Disc).

A learning system using the Internet is known as a service system of this type.

In this learning system, a CD-ROM (Compact Disc ROM) is distributed as a teaching material, and corrections/lessons, questions and answers, and learning result management based on the distributed teaching material are done through the Internet.

A student inserts the purchased CD-ROM to his/her personal computer (to be referred to as a PC hereinafter) to connect it to the Internet and access a corresponding web server on the Internet. Information stored in the CD-ROM is played back in accordance with an instruction from the server side, and the playback information is displayed on the PC. On the basis of the playback information, individual learning such as questions and answers or corrections/lessons is done.

The CD-ROM used in such a learning system can store only a limited amount of information because of its small storage capacity. Since no sufficient learning effect is obtained, use of a DVD (Digital Versatile Disc) having a large storage capacity as the teaching material of the learning system has been examined.

SUMMARY OF THE INVENTION

It is therefore an object of the present invention to make it possible to use a DVD in a service system such as a learning system.

The preferred embodiment provides a service system which includes a digital versatile disc having a first file which stores video and audio information and a second file which stores playback control information for the information in the first file, the information being normally unable to be played back from the digital versatile disc, a terminal connected to a network and adapted to receive the digital versatile disc, and a server arranged in the network and having repair information which can repair the information in the digital versatile disc, the server returning the repair information to the terminal and causing the terminal to play back the information from the digital versatile disc upon receiving a playback request for the information in the digital versatile disc from the terminal when the terminal uses the digital versatile disc.

BRIEF DESCRIPTION OF THE DRAWINGS

FIGS. 2A to 2C are block diagrams of the servers and PC of the service system;

FIGS. 3A to 3C are views for explaining the software configuration of the PC and servers;

DESCRIPTION OF THE PREFERRED EMBODIMENTS

The present invention will be described below with reference to the accompanying drawings.

Figure 1:
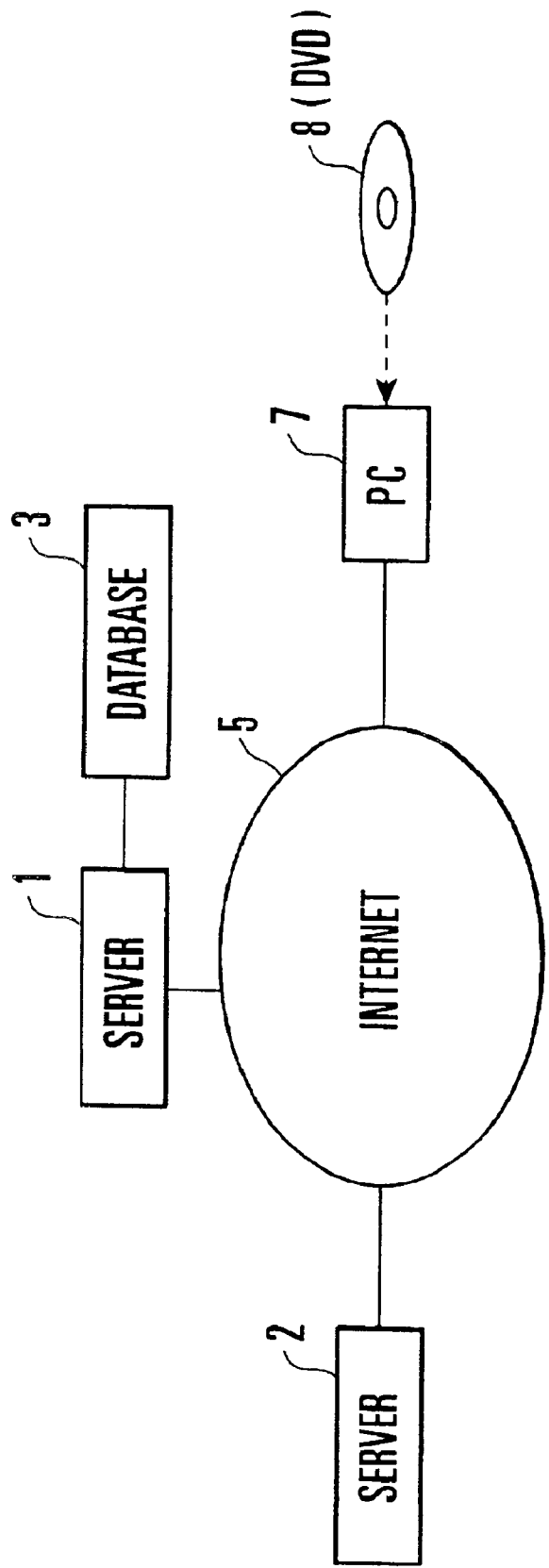
FIG. 1 is a block diagram showing a service system according to the first embodiment.

FIG. 1 shows a service system according to the first embodiment, which uses a DVD. The service system is applied to a learning system using the Internet.

Referring to FIG. 1, in this learning system, servers 1 and 2 are arranged on the Internet 5. The server 1 accommodates a database 3 which stores various kinds of information and also stores textbooks prepared by teachers. The server 2 controls playback of a DVD (Digital Versatile Disc) (to be described later).

A client PC (to be referred to as a PC hereinafter) 7 as a terminal used by a student is connected to the Internet 5. A DVD 8 as a teaching material for the student, which stores video information and audio information, is inserted into the PC 7.

FIGS. 2A to 2C show the hardware configurations of the servers 2 and 1, database 3, and PC 7 of the learning system.

The server 2 includes a control section 21 formed from a CPU or the like, a memory 22 for storing software to be executed by the memory 22 and various data, and a communication I/F 23 for transmitting information through the Internet 5, as shown in FIG. 2A.

The server 1 has a control section 11, memory 12, and communication I/F 13, as shown in FIG. 2B, and is connected to the database 3 having a student information database 3A and progress/playback information database 3B (to be described later).

The PC 7 includes a control section 71, memory 72, DVD I/F 73, communication I/F 74, display section 75, and operation section 76 such as a keyboard, as shown in FIG. 2C.

Figure 7A:
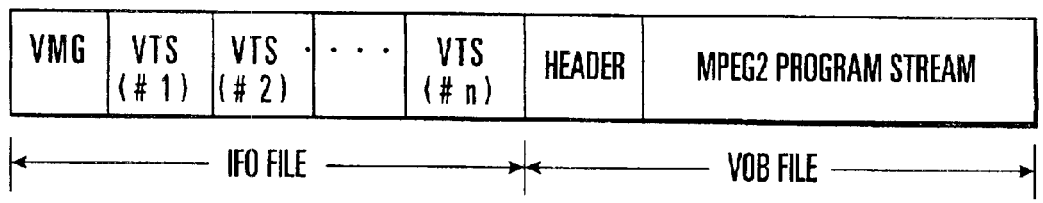
FIGS. 7A to 7E are views showing formats of a DVD inserted to the PC.

The DVD 8 has a format which includes a VMG (Video Manager), VTS (Video Title Set) #1 to #n, and MPEG2 program stream, as shown in FIG. 7A. The MPEG2 program stream is video and audio stream data and is called a VOB (Video OBject) file. The VMG and VTS #1 to #n are called an IFO file which stores control information for access to the VOB file. Such IFO file and VOB file are designated by extensions of DVD-Video.

In the first embodiment of the service system, the incomplete DVD 8 in which the IFO file is partially or entirely erased (or destroyed), or the header of the VOB file is erased (or destroyed), is distributed to the student side for pay. The DVD 8 cannot be played back by a normal player and can be played back in accordance with repair information from the server side, as will be described later.

The software configuration of each section of the learning system will be described next.

As software executed by the control section 71 of the PC 7 used by the student, an Internet browser used to browse homepages (web pages to be described later) in each server on the Internet 5 is stored in the memory 72. Additionally, playback assistant software 7A, playback object 7B, and DVD player 7C shown in FIG. 3A, which are used to play back information in the DVD 8, are installed in the memory 72. The playback assistant software 7A has a repair function for the erased or destroyed IFO and VOB files of the DVD 8. The playback object 7B has a function of transferring repair information to the playback assistant software 7A and causing it to repair the erased (destroyed) portion of the file of the DVD 8 in accordance with an instruction from the server 2 upon executing the Internet browser and also displaying the playback information in the DVD 8 on the display section 75. The DVD player 7C has a function of playing back the information in the DVD 8 on the basis of an instruction from the playback object 7B.

The memory 12 of the server 1 has a web page 1B, as shown in FIG. 3B. The web page 1B stores textbooks prepared by teachers. A textbook stored in the web page 1B is loaded into the PC 7 by executing the Internet browser in the PC 7 and displayed on the display section 75 of the PC 7.

The database 3 connected to the server 1 has the above-described student information database 3A and progress/playback information database 3B. The student information database 3A has a table in which the identification information (ID) of each student and the progress page of each subject (progress page of each textbook) are registered in association with each other. The progress/playback information database 3B has a table in which the progress page of each subject and a playback clip name are registered in association with each other, and a table in which a textbook page in the web page 1B and a playback position in the DVD 8 are registered in association with each other.

As software executed by the control section 11 of the server 1, a security gate 1A shown in FIG. 3B is prepared. The security gate 1A has a function of inhibiting the PC 7 from browsing an impermissible textbook page in the web page 1B and also a function of transmitting an appropriate page content of a textbook in the web page 1B to the PC 7.

As software executed by the control section 21 of the server 2, a server-side playback control object 2A and client-side playback control object 2B as shown in FIG. 3C are prepared. The server-side playback control object 2A is executed by the control section 21 and has a function of transferring the repair information for the DVD 8 and the playback control information (playback start information) of the DVD 8 to the client-side playback control object 2B. The client-side playback control object 2B is software loaded into the PC 7 and executed in accordance with a web page instruction upon executing the Internet browser in the PC 7, and has a function of receiving the repair information for the DVD 8 from the server-side playback control object 2A and transferring the repair information to the playback object 7B of the PC 7 on the basis of the web page instruction.

The memory 22 of the server 2 stores pieces of repair information 2C including the repair information of the IFO file and that of the VOB file of the DVD 8 and also has a database 2D in which a playback clip name and playback position information of the DVD 8 are registered in correspondence with each of the pieces of stored repair information 2C.

Operation of the learning system with the above arrangement will be described with reference to the sequence charts shown in FIGS. 4 to 6.

Prior to the student's learning using the Internet, the server 1 transmits its authentication information to the server 2 in advance (step S1). The server 2 authenticates the server 1 and registers it in the memory 22 (step S2), sends a registration completion notification to the server 1, and also transmits the playback information (information formed from each page of each subject and a corresponding playback clip name) of the DVD 8 stored in the memory 22 to the server 1 (step S3). The server 1 receives the playback information and registers and saves it in the table of the progress/playback information database 3B (step S4).

After such preprocessing, when the student connects his/her PC 7 to the Internet 5 to log in to the server 1 (step S5), the student number (student ID) and password of the student are transmitted to the server 1 (step S6). In this case, the server 1 determines whether the received student number and password are registered in the student information database 3A, and if it is, determines that the student is an authentic student (step S7).

After determining that the student is authentic, the server 1 transmits, to the PC 7, an initial page window where items (subjects) to be learned by the student are sequentially arranged on a window, and makes the display section 75 of the PC 7 display the window (step S8). The student selects a desired item from the initial page window displayed on the PC 7 (step S9). The selection information is transmitted to the server 1 (step S10). Upon receiving the selection information, the security gate 1A of the server 1 extracts the progress page of the item represented by the student number and selection information of the student by looking up the table in the student information database 3A (step S11), transmits, to the PC 7, a page content including image information represented by the progress page of the textbook of the corresponding item, which is stored in the web page 1B, and causes the PC 7 to display the page content (step S12). When the contents of the progress page of the item selected by the student are displayed on the PC 7 as a window and audio data, the student side starts learning the selected subject (step S14). At this time, the student inserts the DVD 8 into the PC 7 (step S13).

The learning progresses as, e.g., the teacher side (i.e., server 1 side) puts a question about the contents of the subject displayed on the screen of the PC 7, and the student side (i.e., PC 7 side) answers the question. If the answer from the student side is correct, the security gate 1A of the server 1 allows progress to the next page. Consequently, the contents of the next page of the subject are sent from the server 1 side to the PC 7 and displayed on the PC 7 as a window and audio data, so learning about the page contents progresses in a similar way. The learning of the selected item sequentially progresses in this way. When the learning is ended, the page of the textbook of the selected item under learning is registered as a progress page corresponding to the student number in the student information database 3A. Next time, the learning starts from the contents of that page.

When the student clicks on an omitted portion in the displayed window of the textbook page under learning in order to compensate for the omitted portion with the information of the DVD 8, a DVD playback request is transmitted from the PC 7 to the server 1 (step S15).

Figure 4:
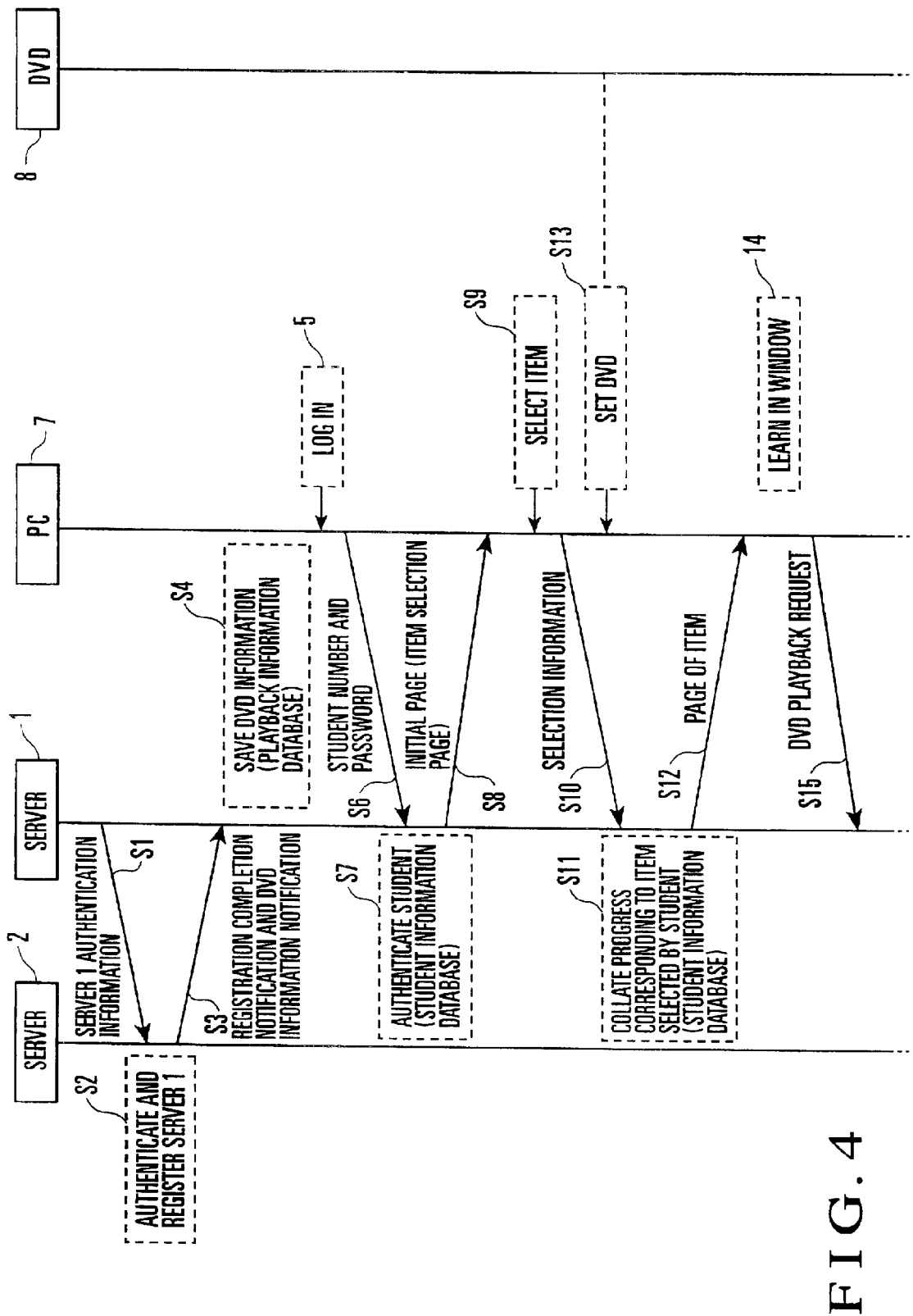
FIG. 4 is a sequence chart showing operations of the respective sections of the system shown in FIG. 1.
Figure 5:
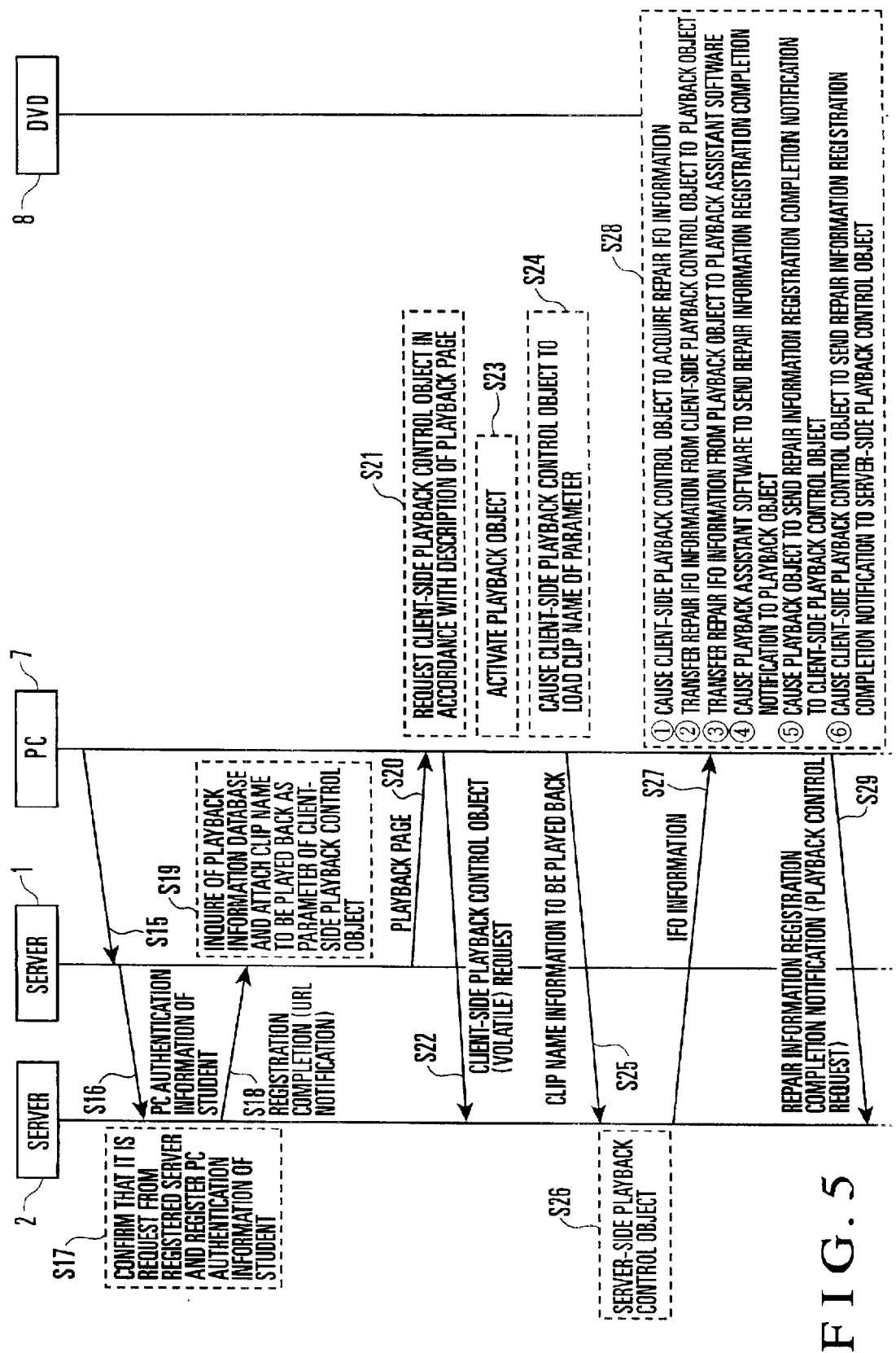
FIG. 5 is a sequence chart showing operations of the respective sections of the system shown in FIG. 1.

When the DVD playback request is transmitted from the PC 7, the server 1 notifies the server 2 of the PC authentication information of the student in step S16 of FIG. 5. The server 2 recognizes that the request is from the server 1 that has already been authenticated and registered in step S2 of FIG. 4, and registers the PC authentication information of the student, which is transmitted from the server 1 (step S17). The server 2 transmits, to the server 1, the URL (Uniform Resource Locator) location (address) in the server 2 of the client-side playback control object 2B as a student authentication registration completion notification (step S18).

Upon receiving the URL of the client-side playback control object 2B from the server 2, the server 1 extracts a playback clip name corresponding to the DVD playback request transmitted from the PC 7 by looking up the progress/playback information database 3B in which the playback clip name transmitted from the server 2 in advance is saved, attaches the playback clip name as a parameter of the client-side playback control object 2B (step S19), and notifies the PC 7 of it as a playback page (step S20). The PC 7 requests the server 2 to acquire the client-side playback control object 2B in accordance with the description in the transmitted playback page (steps S21 and S22). The PC 7 side acquires the client-side playback control object 2B. The acquired client-side playback control object 2B is called a volatile playback control object because it is used only when the playback information of the DVD 8 is to be displayed at a position corresponding to the playback clip name of the textbook page, and a new playback control object must be acquired to display the playback information of the DVD 8 at a position corresponding to a new playback clip name.

The PC 7 acquires the client-side playback control object 2B from the server 2 and then activates the playback object 7B (step S23). By executing the acquired client-side playback control object 2B, the PC 7 loads the playback clip name attached to the object 2B as a parameter (step S24). The loaded playback clip name is sent to the server 2 (step S25).

When the playback clip name is sent, the server 2 executes the server-side playback control object 2A (step S26), receives the playback clip name, extracts, e.g., the repair IFO information 2C corresponding to the playback clip name from the memory 22 by looking up the database 2D, and sends the repair information to the PC 7 side (step S27). The PC 7 performs the following processing in step S28.

The PC 7 executes the acquired client-side playback control object 2B to acquire the repair IFO information from the server 2, and transfers the information to the playback object 7B. The playback object 7B transfers the repair IFO information to the playback assistant software 7A. The playback assistant software 7A registers the repair IFO information and transmits a registration completion notification to the playback object 7B. The repair IFO information registration completion notification is further transmitted from the playback object 7B to the client-side playback control object 2B.

Upon receiving the repair IFO information registration completion notification from the playback object 7B, the client-side playback control object 2B transmits the registration completion notification to the server-side playback control object 2A of the server 2 (step S29).

Figure 6:
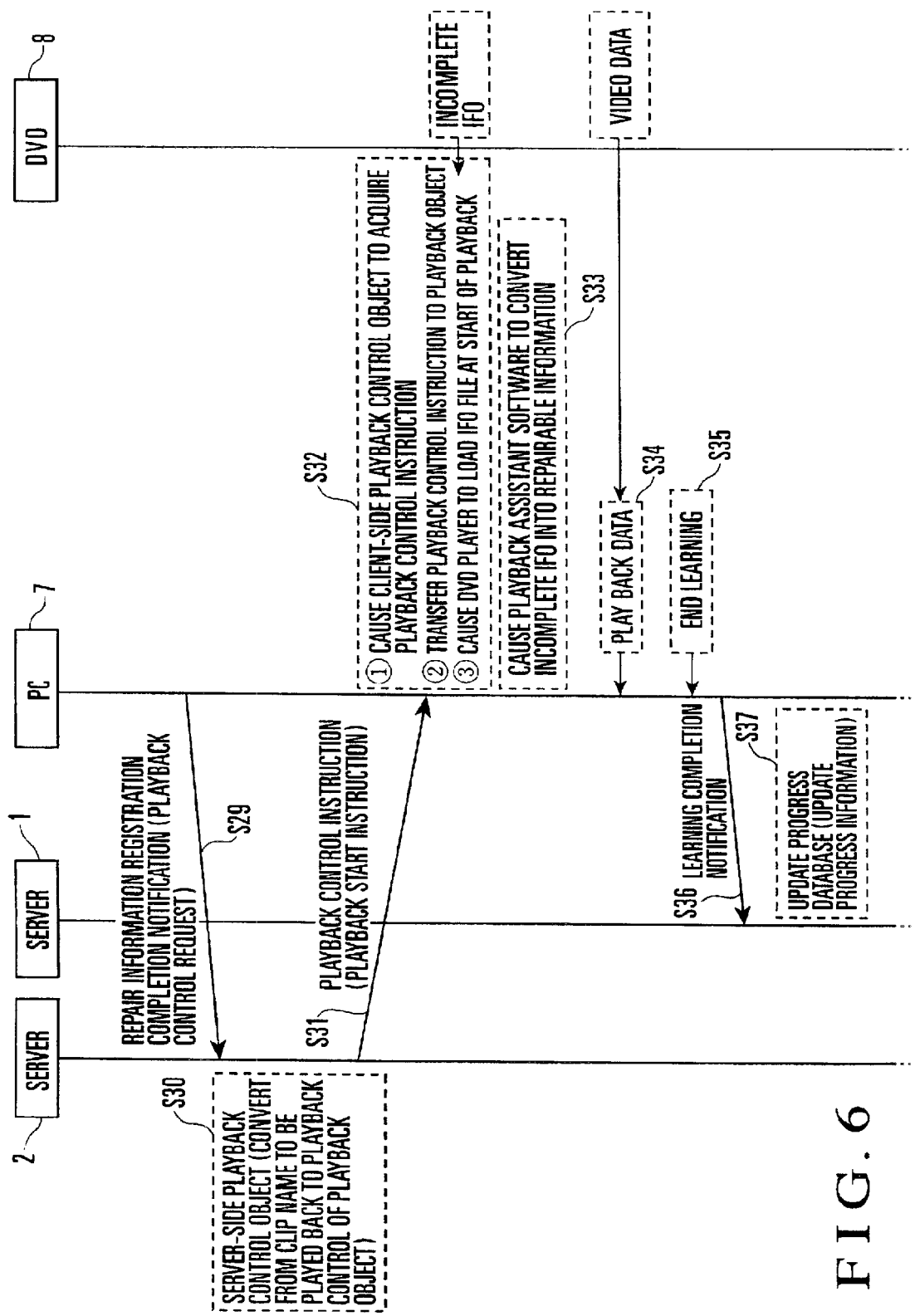
FIG. 6 is a sequence chart showing operations of the respective sections of the system shown in FIG. 1.

When notified of the repair IFO information registration completion notification, in step S30 of FIG. 6, the server-side playback control object 2A of the server 2 transmits, to the PC 7, the playback position information of the DVD 8 in the database 2D, which corresponds to the playback clip name received in step S25 of FIG. 7, as playback control instruction information (playback start instruction information) to be executed by the playback object 7B of the PC 7 (step S31).

When the playback control instruction information is transmitted from the server 2 to the PC 7, the PC 7 performs the following processing in step S32. The client-side playback control object 2B is executed to acquire the playback control instruction information from the server 2, the acquired information is transferred to the playback object 7B, the playback object 7B instructs the DVD player 7C and playback assistant software 7A to play back the DVD 8, and the playback control instruction information is transferred to the playback assistant software 7A. In starting playing back the DVD 8, the DVD player 7C plays back the incomplete IFO file of the DVD 8.

When the DVD player 7C plays back the incomplete IFO file of the DVD 8, the playback assistant software 7A converts the playback information into information repairable in accordance with the playback control instruction information and the registered repair IFO information (step S33) and sends the information to the playback object 7B. The playback object 7B recognizes the incomplete IFO file as a normal IFO file and subsequently executes playback processing to display a video signal played back next to the IFO file by the DVD player 7C at the omitted portion of the display window on the display section 75 (step S34). The learning is continued as the video signal corresponding to the omitted portion of the display window is played back and displayed.

When the page is completely learned, learning of the next page starts, and an omitted portion in the display window for the page need be compensated for by the information of the DVD 8, the student clicks on the omitted portion, as described above. The flow returns to step S15 in FIG. 5. A DVD playback request is sent from the PC 7 to the server 1, and the processing steps from step S16 of FIG. 5 and the processing steps in FIG. 6 are executed again. In this case, the PC 7 acquires a client-side playback control object for playing back the omitted portion of the new page from the DVD 8, which is different from the preceding client-side playback control object. By executing this new client-side playback control object, playback processing of playing back a video signal in the DVD 8 and displaying the signal at the omitted portion of the display window on the display section 75 is performed (step S34).

When the learning of the pages of the selected subjects sequentially progresses, and the student ends the learning on the PC 7 (step S35), a learning completion notification is sent to the server 1 (step S36). Upon receiving the learning completion notification, the server 1 accesses the progress/playback information database 3B in the database 3 to update progress information (page of the selected subject) corresponding to the student number (step S37), and the processing is ended.

As described above, this learning system makes it possible to use the DVD 8 having a large storage capacity as a teaching material. As a result, a sufficient learning effect can be obtained. In addition, before the DVD 8 is provided to the student side, the IFO file of the DVD 8 is erased (or destroyed) in advance such that the DVD 8 is provided in an incomplete form. When the student uses the DVD 8, repair IFO information is transmitted from the server side, so the information of the DVD 8 can be played back in accordance with the repair IFO information. Hence, since the DVD 8 which is distributed to the student, e.g., for pay, it cannot be played back by a normal player, any illicit use of the DVD 8 by a third party can be prevented, and the provider who provides this system can be prevented from suffering loss.

In the above-described first embodiment, the playback assistant software 7A and playback object 7B are installed in the PC 7 in advance. However, the playback assistant software 7A and playback object 7B may be downloaded from the server 1 and stored in the memory of the PC 7 when the DVD 8 is set in the PC 7. Alternatively, the playback assistant software 7A and playback object 7B may be stored in the DVD 8, and when the DVD 8 is inserted into the PC 7, the server 1 may send an instruction to the PC 7, and the PC 7 may load the playback assistant software 7A and playback object 7B from the DVD 8 and store them in the memory in accordance with the instruction.

In the first embodiment, an omitted portion in the display window of a textbook page is displayed in accordance with information played back from the DVD 8. The playback information includes not only a video signal but also an audio signal. In addition, one page of a textbook may be played back from the DVD 8 and displayed on the PC 7.

In the sequence charts shown in FIGS. 4 to 6, an incomplete IFO file that is erased or destroyed is repaired to a complete IFO file, and video data in the subsequent VOB file is played back and displayed on the PC 7. Modifications that inhibit playback of a DVD 8 will be described as the second embodiment.

As the first modification, the header field of the VOB file may be erased (or destroyed) in advance to make the file incomplete, as described above, and the header field may be repaired to play back the video signal in the subsequent VOB file and display it on a PC 7. Alternatively, the video signal or the like in the VOB file of the DVD 8 may be erased (or destroyed) in advance to make the file incomplete, and this portion may be repaired by the repair information from the server side and displayed on the PC 7.

As the second modification, the IFO file of the DVD 8 may be wholly erased (all data are "0"; the file size is the same as that of a normal file). When a playback request for the DVD 8 is received from the PC 7, the IFO file may be sent from the server side to the PC 7 as repair information, and the PC 7 may play back the VOB file of the DVD 8 on the basis of the IFO file.

As the third modification, the IFO file of the DVD 8 may be formed as a file having a size "0", and the IFO file may be repaired to a normal file by repair information from the server side.

As the fourth modification, only the VOB file may be stored in the DVD 8 in advance. When a playback request for the DVD 8 is received from the PC 7, the IFO file may be sent from the server side to the PC 7, and the PC 7 may play back the VOB file of the DVD 8 on the basis of the IFO file.

As the fifth modification, the physical layout in the IFO file of the DVD 8 may be changed, and the PC 7 may repair the IFO file to a normal file in accordance with repair information from the server side and play back the VOB file of the DVD 8 on the basis of the IFO file.

Figure 7B:
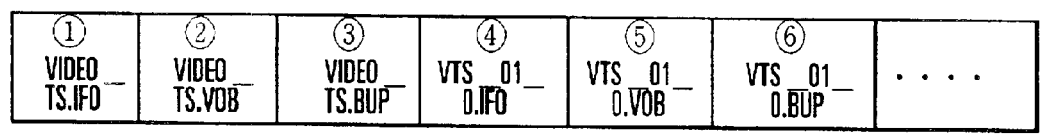

More specifically, as the physical layout in the IFO file of the DVD 8, for example, ① VIDEO_TS.IFO to ⑥ VTS_01_0.IFO are normally laid out as shown in FIG. 7B.

In this case, for example, ⑥ VTS_01_0.IFO and ① VIDEO_TS.IFO may be exchanged to form an abnormal file, and the IFO file may be repaired to a normal file by repair information from the server side such that the video data in the VOB file can be played back. In this case, the VOB file may have an abnormal physical layout, or both the VOB file and the IFO file may have abnormal layouts.

As the sixth modification, the DVD 8 is designed such that at least one of the IFO and VOB files is not placed under the VIDEO_TS directory.

Figure 7C:
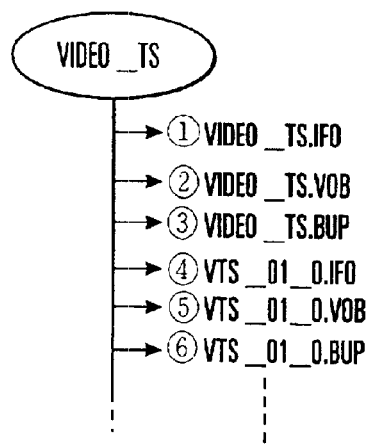

More specifically, the DVD 8 normally has a logic structure as shown in FIG. 7C, in which the IFO and VOB files such as VIDEO_TS.IFO and VIDEO_TS.VOB are placed under the VIDEO_TS directory. In this case, the logic structure of the DVD 8 may be changed such that the IFO file or VOB file is not placed under the VIDEO_TS directory, and the structure may be repaired to a normal logic format by repair information from the server side. With this processing, the PC 7 can play back the information in the VOB file.

As the seventh modification, the IFO file name or VOB file name such as VIDEO_TS.IFO or VIDEO_TS.VOB located under the VIDEO_TS directory may be changed to an impossible file name such as XXXX.YYY, and the name may be repaired to a normal file name by repair information from the server side.

As the eighth modification, file system information (File Set Descriptor, File Identifier Descriptor, File Entry, ICB, and the like) may be partially or entirely erased from the DVD 8, and the information may be repaired to a normal file name by repair information from the server side.

Figure 7D:
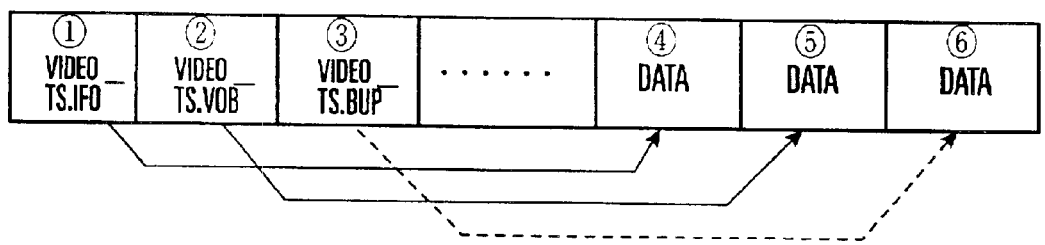

More specifically, VIDEO_TS.IFO, VIDEO_TS.VOB, and VIDEO_TS.BUP shown in FIG. 7D are regarded as the file system information. When data corresponding to these pieces of file system information are independently stored, and a piece of file system information is erased, data corresponding to the file system information cannot be played back. In this case, when normal file system information is transmitted for the server side to the PC 7, the PC 7 can play back the information in the DVD 8.

As the ninth modification, the IFO and VOB files of the DVD 8 may be created as the DVD standard, and all video images in the DVD 8 may be played back in accordance with repair information (new IFO information) from the server side.

Figure 7E:
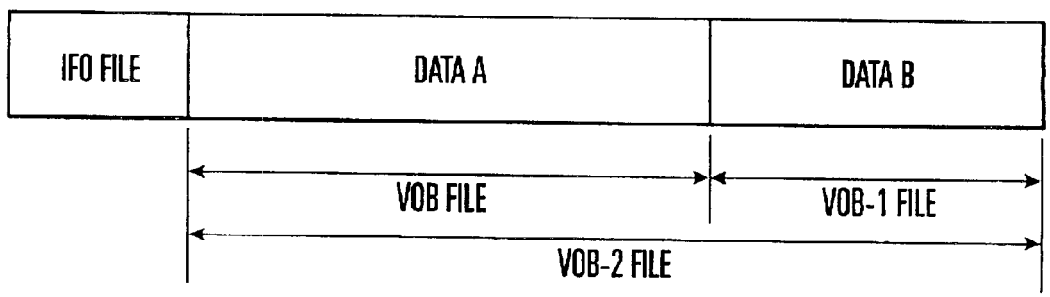

More specifically, for the DVD 8, normally, the IFO file and the VOB file corresponding to data A are created as the DVD standard, as shown in FIG. 7E. When a playback request for such a DVD 8 is received from the PC 7, the server side sends a new IFO file to the PC 7. The PC 7 can play back information in a VOB-1 file corresponding to data B in FIG. 7E by the new IFO file and consequently play back all VOB files (VOB-2 file) of the DVD 8.

Of the above-described first to ninth modifications that inhibit playback of video data in the DVD 8, the fifth to eighth modifications can be combined with other modifications except the ninth modification.

As described above, the DVD 8 that cannot be played back by a normal player is provided to the user, and when the DVD 8 is set in the PC 7, and a playback request is sent from the PC 7, the server side transmits repair information for the DVD B to the PC 7 to allow the PC 7 to play back the DVD 8.

Such a DVD 8 is provided to the user (student side) by a provider who provides this system, as described above. The system provider must appropriately charge the user for use of the DVD 8. In the third embodiment, charging methods will be described.

As the first charging method, the user is charged in units of DVDs.

As the second charging method, the server use charge (per month or year) is collected from the user.

As the third charging method, the user is charged every time the DVD is played back (i.e., for each access to the server).

As the fourth charging method, the user is charged when he/she accesses the server, and after that, the video information in the DVD is played back for the user (prepayment).

As the fifth charging method, a content such as an advertisement is inserted into the DVD 8, and the advertiser is charged.

As the sixth charging method, playback assistant software 7A and playback object 7B are stored in each DVD, as described above, and a license fee is collected at the time of sale or distribution of each DVD.

As the seventh charging method, a person who has developed DVD software to be used in this system is charged.

As the eighth charging method, the system provider causes a third party to operate the server and collects a software license fee from the third party.

When the above charging methods are employed, the system provider can operate the system without suffering loss.

Figure 8:
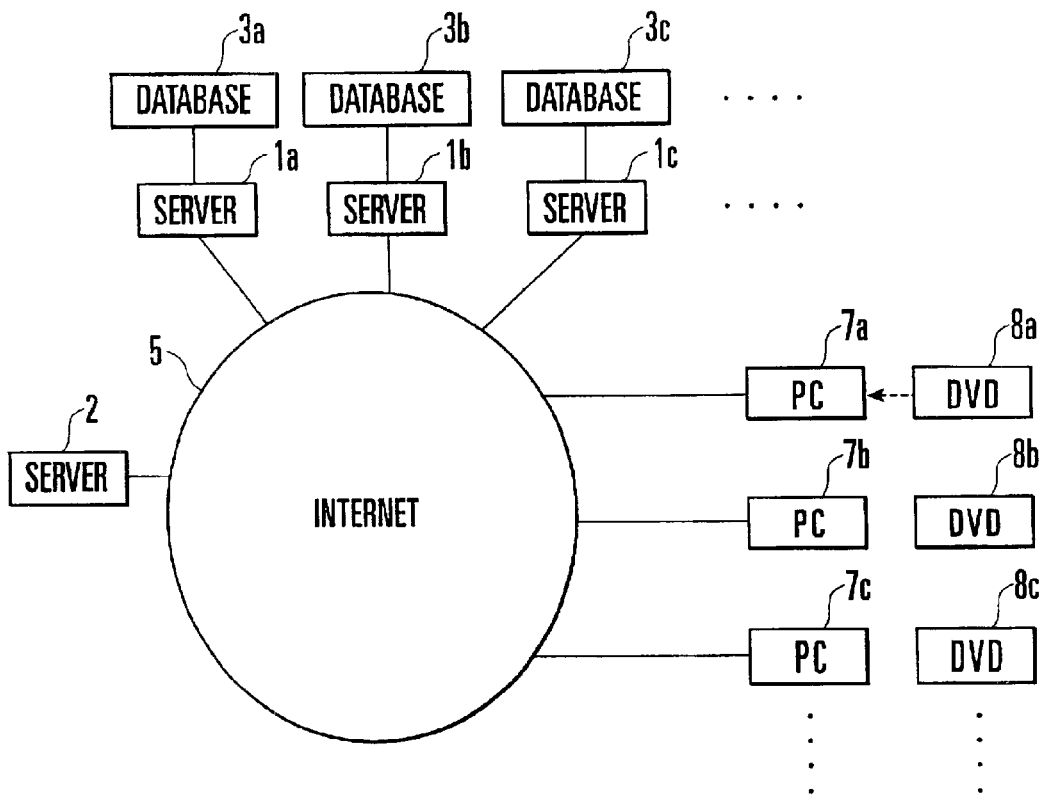
FIG. 8 is a block diagram showing a service system according to the fourth embodiment.

FIG. 8 shows the fourth embodiment of the service system. In the first embodiment shown in FIG. 1, the servers 1 and 2 are prepared. However, as shown in FIG. 8, one server 2 may be commonly used by a plurality of servers 1a to 1c. With this arrangement, the plurality of servers can be unitarily managed by the single server 2. In this case, the servers 1a to 1c may be in charge of different subjects, or the servers 1a to 1c may function as schools.

Figure 9:
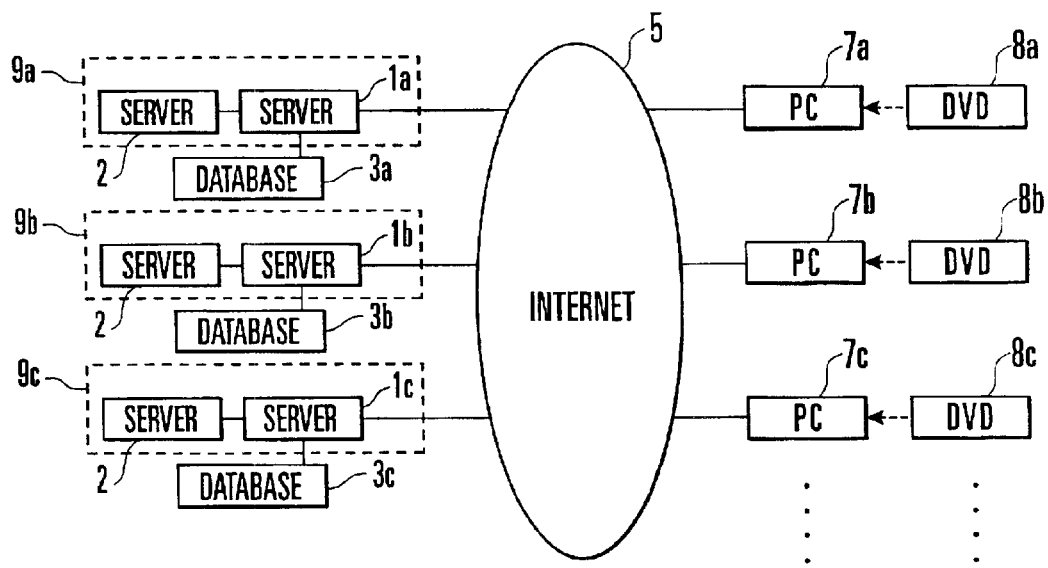
FIG. 9 is a block diagram showing a service system according to the fifth embodiment.

Alternatively, as in the fifth embodiment shown in FIG. 9, servers 1 and 2 may be integrated into a single server 9 and servers 9a to 9c may be connected to databases 3a to 3c, respectively. In this case, the servers 9a to 9c may be in charge of different subjects, or the servers 9a to 9c may function as schools.

As has been described above, the service system has a DVD having a first file (VOB file) which stores video and audio information and a second file (IFO file) which stores playback control information for the information in the first file, the information being normally unable to be played back from the DVD, a PC connected to the Internet and adapted to receive the DVD, and a server arranged in the Internet and having repair information which repairs the information in the DVD whose information cannot be played back. Upon receiving a playback request for the information in the DVD from the PC, the server returns the repair information to the PC and causes it to play back the information from the DVD. When this system is applied to a learning system, the digital versatile disc 8 having a large storage capacity can be used as a teaching material, and consequently, sufficient learning effect can be obtained. In addition, since the information in the DVD which is distributed to the student side, e.g., for pay, it cannot be played back by a normal player, any illicit use of the DVD by a third party can be prevented, and the provider who provides this system can be prevented from suffering loss.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A service system comprising:

a digital versatile disc having a first file which stores video and audio information and a second file which stores playback control information for the information in the first file, the information being normally unable to be played back from said versatile disc;

a terminal connected to a network and adapted to receive said digital versatile disc; and a server arranged in the network and having repair information which can repair the information in said digital versatile disc, said server returning the repair information to said terminal and causing said terminal to play back the information from said digital versatile disc upon receiving a playback request for the information in said digital versatile disc from said terminal when said terminal uses said digital versatile disc wherein said server comprises first and second servers, said first server having a database in which a pair of identification information of a student who learns a subject using said terminal and progress information of the subject are registered, and having a first memory which stores contents of each page of the subject, said second server having a second memory in which a pair of the repair information and playback control instruction information for said digital versatile disc are registered in relation to playback designation information output when said terminal sends the playback request, and said first server transmitting page contents of said first memory designated by the progress information corresponding to the identification information of the student in said database and causing said terminal to display the contents at the time of learning by the student, and upon receiving the playback designation information output when said terminal sends the playback request, outputting the playback designation information to said second server and causing said second server to transmit, to said terminal, the repair information corresponding to the playback designation information and the playback control information for said digital versatile disc in said second memory, thereby allowing said terminal to play back the information in said digital versatile disc.

2. A system according to claim 1, wherein said terminal comprises a player for playing back the information in said digital versatile disc;

playback assistant means for repairing the information in said digital versatile disc, which is played back by said player, on the basis of the repair information; and playback means for, upon receiving the repair information and playback control instruction information, sending the received repair information to said playback assistant means, instructing said playback assistant means and player to play back said digital versatile disc on the basis of the received playback control instruction information, and displaying playback information of the first file of said digital versatile disc on the basis of a repair output from said playback assistant means.

3. A system according to claim 2, wherein said second server has first and second playback control means for controlling playback of the information in said digital versatile disc, said second server causes said terminal to acquire said second playback control means in accordance with authentication information of said terminal, which is output from said first server when said terminal sends the playback request for the information in said digital versatile disc, and said second playback control means acquired by said terminal transmits the playback designation information to said first playback control means, upon receiving the playback designation information, said first playback control means sends the repair information in said second memory, which corresponds to the playback designation information, to said second playback control means and causes said second playback control means to send the repair information to said playback means, and after the repair information is sent, said second playback control means requests said first playback control means to send the playback control instruction information, and upon receiving the sending request, said first playback control means sends the playback control instruction information in said second memory, which corresponds to the playback designation information, to said second playback control means and causes said second playback control means to send the playback control instruction information to said playback means.

4. A system according to claim 1, further comprising charging means for charging for use of said digital versatile disc.

5. The system of claim 1, wherein at least a portion of the first file of the digital versatile disc is incomplete, and wherein the repair information returned to the terminal from the server comprises the missing portion of the first file of the digital versatile disc.

6. The system of claim 1, wherein at least a portion of the second file is absent from the digital versatile disk, and wherein the repair information returned to the terminal from the server comprises the missing information for the second file of the digital versatile disc.

7. The system of claim 1, wherein the second file is corrupted on the digital versatile disk by having a file size of zero, and wherein the repair information returned to the terminal from the server comprises information to repair the file size of the second file of the digital versatile disc.

8. The system of claim 1, wherein the second file on the digital versatile disk has an incorrect physical layout, and wherein the repair information returned to the terminal from the server comprises information to repair the physical layout of the second file of the digital versatile disc.

9. The system of claim 1, wherein the first file and/or the second file on the digital versatile disk is placed in an incorrect directory, and wherein the repair information returned to the terminal from the server comprises information to restore the first and/or second files to the proper directories of the digital versatile disc.

10. The system of claim 1, wherein the first file and/or the second file on the digital versatile disk have an incorrect file name, and wherein the repair information returned to the terminal from the server comprises information to correct the file name of the first and/or second files of the digital versatile disc.

11. The system of claim 1, wherein the file system information of the digital versatile disk is at least partially missing, and wherein the repair information returned to the terminal from the server comprises the file system information missing from the digital versatile disc.

12. The system of claim 1, wherein at least a portion of the first file and/or the second file of the digital versatile disc is configured non-functionally, and wherein the repair information returned to the terminal from the server reconfigures the first file and/or the second file of the digital versatile disc so that the first file and/or the second file is configured functionally.

13. The system of claim 1, wherein the first and second files of the digital versatile disc may be created according to a digital versatile disc standard, and all video images in the digital versatile disc are played back in accordance with repair information from the server side.

14. The system of claim 1, wherein when the subject is taught using the server contents and the digital versatile disc contents are used as the supplemental material, the repair information of the digital versatile disc contents is transmitted from the server to the terminal upon requesting the supplemental material.

15. A learning method comprising:

providing a digital versatile disc having a first file which stores video and audio information and a second file which stores playback control information for the information in the first file, wherein the information on the said digital versatile disc is incomplete, requiring repair for playback;

placing the said digital versatile disc into a terminal coupled through a network to a server, wherein the server comprises a memory in which repair information and playback control instruction information for said digital versatile disc are registered; and transmitting repair information from the server to the terminal, wherein the terminal allows playback of the information in said digital versatile disc wherein said server comprises first and second servers, said first server having a database in which a pair of identification information of a student who learns a subject using said terminal and progress information of the subject are registered, and having a first memory which stores contents of each page of the subject, said second server having a second memory in which a pair of the repair information and playback control instruction information for said digital versatile disc are registered in relation to playback designation information output when said terminal sends the playback request, and wherein transmitting repair information from the server to the terminal comprises the said first server transmitting page contents of said first memory designated by the progress information corresponding to the identification information of the student in said database and causing said terminal to display the contents at the time of learning by the student, and upon receiving the playback designation information output when said terminal sends the playback request, outputting the playback designation information to said second server and causing said second server to transmit, to said terminal, the repair information corresponding to the playback designation information and the playback control information for said digital versatile disc in said second memory, thereby allowing said terminal to play back the information in said digital versatile disc.

16. The method of claim 15, wherein the terminal is configured to receive and play back information in the said digital versatile disc.

17. The method of claim 15, wherein the terminal comprises a playback assistant for repairing the information in said digital versatile disc in accordance with the repair information.

18. The method of claim 15, wherein the server is further configured with a database comprising registration information of student identification and subject progress.

19. The method of claim 18, wherein the page contents of a subject is transmitted from the memory to the terminal to be displayed.

20. The method of claim 15, wherein the memory of the server is further configured to store page contents of a subject.

21. The method of claim 15, wherein the server is used by or integrated with a number of other servers.

22. The method of claim 15, wherein a charging method is employed for use of the digital versatile disc.

23. The method of claim 15, wherein at least a portion of the first file of the digital versatile disc is incomplete, and wherein the repair information returned to the terminal from the server comprises the missing portion of the first file of the digital versatile disc.

24. The method of claim 15, wherein at least a portion of the second file is absent from the digital versatile disk, and wherein the repair information returned to the terminal from the server comprises the missing information for the second file of the digital versatile disc.

25. The method of claim 15, wherein the second file is corrupted on the digital versatile disk by having a file size of zero, and wherein the repair information returned to the terminal from the server comprises information to repair the file size of the second file of the digital versatile disc.

26. The method of claim 15, wherein the second file on the digital versatile disk has an incorrect physical layout, and wherein the repair information returned to the terminal from the server comprises information to repair the physical layout of the second file of the digital versatile disc.

27. The method of claim 15, wherein the first file and/or the second file on the digital versatile disk is placed in an incorrect directory, and wherein the repair information returned to the terminal from the server comprises information to restore the first and/or second files to the proper directories of the digital versatile disc.

28. The method of claim 15, wherein the first file and/or the second file on the digital versatile disk have an incorrect file name, and wherein the repair information returned to the terminal from the server comprises information to correct the file name of the first and/or second files of the digital versatile disc.

29. The method of claim 15, wherein the file system information of the digital versatile disk is at least partially missing, and wherein the repair information returned to the terminal from the server comprises the file system information missing from the digital versatile disc.

30. The method of claim 15, wherein at least a portion of the first file and/or the second file of the digital versatile disc is configured non-functionally, and wherein the repair information returned to the terminal from the server reconfigures the first file and/or the second file of the digital versatile disc so that the first file and/or the second file is configured functionally.

31. The method of claim 15, wherein the first and second files of the digital versatile disc may be created according to a digital versatile disc standard, and all video images in the digital versatile disc are played back in accordance with repair information from the server side.

* * * * *